United States Patent
Ikeda

(10) Patent No.: US 6,917,382 B1
(45) Date of Patent: Jul. 12, 2005

(54) SIGNAL PROCESSING APPARATUS AND METHOD THEREOF

(75) Inventor: Eiichiro Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 09/624,622

(22) Filed: Jul. 25, 2000

(30) Foreign Application Priority Data

Jul. 27, 1999 (JP) .......................................... 11-212645

(51) Int. Cl.[7] ............................................. H04N 5/202
(52) U.S. Cl. ..................... 348/254; 348/222.1; 348/674
(58) Field of Search ............................... 348/255, 256, 348/222.1, 254, 674

(56) References Cited

U.S. PATENT DOCUMENTS

| | | | | |
|---|---|---|---|---|
| 5,345,265 A | * | 9/1994 | Kim ........................... | 348/254 |
| 5,404,165 A | * | 4/1995 | Ohtsubo et al. ............ | 348/254 |
| 5,408,267 A | * | 4/1995 | Main .......................... | 348/254 |
| 5,473,373 A | * | 12/1995 | Hwung et al. ............... | 348/254 |
| 5,481,317 A | * | 1/1996 | Hieda .......................... | 348/674 |
| 5,521,637 A | * | 5/1996 | Asaida et al. ............. | 348/222.1 |
| 5,767,899 A | * | 6/1998 | Hieda et al. .............. | 348/222.1 |
| 5,818,521 A | * | 10/1998 | Hieda ........................ | 348/222.1 |
| 6,141,047 A | * | 10/2000 | Kawai et al. ................ | 348/254 |
| 6,317,157 B1 | * | 11/2001 | Takayama ................... | 348/441 |

* cited by examiner

*Primary Examiner*—Andrew Christensen
*Assistant Examiner*—Brian Genco
(74) *Attorney, Agent, or Firm*—Fitzpatrick, Cella, Harper & Scinto

(57) ABSTRACT

In a signal processing apparatus which can output a chroma signal of m bits into a chroma signal of n bits via an output apparatus, the chroma signal of m bits is gamma converted into a chroma signal of k bits, the gamma converted chroma signal of k bits is converted into a signal of k bits showing a brightness and a color tone, and the signal converted into the signal of k bits showing the brightness and color tone is converted into a signal of n bits showing a brightness and a color tone. Thus, a signal processing apparatus is provided in which color crush in a high luminance area of an image can be remarkably reduced, and white skip of the image and discoloration are remarkably improved.

20 Claims, 6 Drawing Sheets

FIG. 3

| Mg | G  | Mg | G  |
|----|----|----|----|
| Cy | Ye | Cy | Ye |
| Mg | G  | Mg | G  |
| Cy | Ye | Cy | Ye |

SIGNAL PROCESSING APPARATUS AND METHOD THEREOF

BACKGROUND OF THE INVENTION

1. Field of the Invention

The invention relates to a signal processing apparatus and method for processing an image signal of an image pickup apparatus such as a digital camera or the like.

2. Related Background Art

FIG. 2 shows a construction of a conventional signal processing apparatus using image pickup devices of a complementary color system. Color filters of four colors of Mg (magenta), G (green), Cy (cyan), and Ye (yellow), as shown in FIG. 3, are adhered to the image pickup devices for each device, in order. An output signal from the image pickup device is transmitted through an OB (Optical Black) circuit 201, an individual difference variation correction circuit (pixel gain circuit) 202, a WB (White Balance) circuit 203, and an offset circuit 204 and separately supplied to a luminance signal formation processing system and a chroma signal formation processing system.

In the luminance signal formation processing system, a gain level difference which is caused by the color filters is removed by a low pass filter (notch circuit) 215 and a clamping process is performed to a luminance signal by a Y clamp circuit 216. Subsequently, an edge emphasis is performed by an APC (aperture) circuit 217. A level correction by color difference signals is performed by a Y compensation circuit (Ycomp circuit, luminance signal compensation circuit) 218. Thus, the luminance signal becomes a Yh luminance signal of 8 bits by a Y gamma (Y-Gamma, luminance signal gamma correction) circuit 219 having conversion characteristics as shown by a curve 502 in FIG. 5.

In the chroma signal formation processing system, ti the signal is interpolated by a color interpolation circuit 205 as if there were values in all pixels of four colors. A conversion of (the complementary colors →pure colors→color difference) is performed by a color matrix circuit (color conversion circuit) 206. A subtle correction of a chroma signal is performed by a linear clip matrix circuit 207. Subsequently, a gain of chroma signal in a saturation luminance area is suppressed by a C-SUP (chroma suppression) circuit 206. A band of the chrome signal is limited by a low pass filter 209. After that, a saturation is adjusted by a chroma gain circuit 210. Thereafter, the chroma signal is again converted into RGB signals by a matrix circuit 211 by a low band Yl signal and the color difference signals.

The low band ROB signals become RGB (red, green, blue) signals of 8 bits by a C gamma (chroma signal gamma correction) circuit 213 having the conversion characteristics as shown by the curve 502 in FIG. 5. Subsequently, the RGB signals are converted into color difference signals Cr and Cb by a color conversion circuit 214.

An image signal is formed by the Yh signal from the luminance signal formation processing system and the Cr and Cb signals from the chroma signal formation processing system.

However, when the luminance signal and the chroma signal are gamma converted into signals having the same number of bits as in the above conventional technique, the following problems occur.

Generally, each of RGB of an output range of a monitor, as an output apparatus, consists of 8 bits, and there are gamma characteristics as shown by a curve 401 in FIG. 4. An output of the camera is a linear signal in which, for example, each of RGB consists of 11 bits. It is, therefore, necessary to non-linearly compress (gamma conversion) the camera output to a signal having the number of bits of the output apparatus, in accordance with the characteristics of the monitor.

Therefore, although linear conversion of a luminance signal is preferable, so as to prevent deterioration of the hue, when linear conversion is performed, an image becomes dark due to influence by the gamma characteristics, of the monitor. To accurately reconstruct the gradations of the luminance, therefore, a reverse gamma conversion of the monitor characteristics as shown by a curve 402 in FIG. 4 (a curve 504 in FIG. 5), is performed. Although there is a slight deviation of the hue, the accurate gradation reconstruction of the luminance is held. If there is such a gamma curve, however, the image becomes an image which lacks contrast in a middle luminance area of a main object.

Hitherto, therefore, a gamma curve which can enhance a contrast of a draw area (middle luminance area) of the main object, as shown by the curve 502 in FIG. 5, is used or a plurality of gamma curves according to the application are selectively used in accordance with a mode. In the case where data of a curve, as shown by the curve 502, is used in order to improve the contrast of the main object, it is necessary to further reduce the gradations in the low luminance area or high luminance area by an increased amount of the contrast in the middle luminance area. In this case, as shown in FIG. 5, particularly in a high luminance and high saturation area of the chroma signal, an output signal difference between R and G in an output of the 8-bit C gamma circuit 213 shown in FIG. 5(a) is smaller than an output signal difference between R and G of the 8-bit C gamma circuit at the timing before the gradations of the middle luminance area in FIG. 5(c) are increased, the saturation is deteriorated, and the output signal difference between B and G is not largely changed, so that the hue remarkably deviates. There are, consequently, drawbacks that occur, such as deterioration in color reconstruction of the high luminance area of the image after gamma conversion, likelihood the image will be white skipped, and discoloration.

An example of the conversion of the chroma signal in the case of a gamma system when the conventional 8-bit C gamma curve 502 is used will be discussed hereinbelow.

<1> 8-Bit C-Gamma (a) Before gamma (11-bit RGB)

R=1400

G=1100

B=400

(b) After gamma (8-bit RGB)

R=236

G=228

B=140

Yh=0.3R+0.59G+0.11B=221

(c) RGB-YCrCb conversion

Yl=0.3R+0.59G+0.11B=221

Cr=R−Y=15

Cb=B−Y=−81

(d) MIX with Yh signal on the output apparatus side

Yh = 220
R = Cr + Yh = 235
B = Cb + Yh = 139
G = (Yh − 0.3R − 0.11B)/0.59
  = 212

A ratio of the level differences among the signals of RGB remarkably differs as compared with that of the signals before the gamma conversion (refer to FIG. 5(a)). Thus, the image becomes a picture whose hue changes and which is white skipped.

SUMMARY OF THE INVENTION

The invention is made in consideration of the above drawbacks and it is an object of the invention to provide a signal processing apparatus in which a color crush in the high luminance area of the image after the gamma conversion can be fairly reduced and the white skip of the image and the discoloration are remarkably improved.

To accomplish the above object, according to an aspect of an embodiment of the invention, there is provided a signal processing apparatus which can output a chrome signal of m bits as a chroma signal of n bits by an output apparatus, comprising: a gamma converting unit for gamma converting the chroma signal of m bits into a chroma signal of k bits; a color converting unit for converting the chroma signal of k bits obtained by the gamma converting unit into a signal of k bits showing a brightness and a color tone; and bit converting unit for converting the signal of k bits showing the brightness and color tone obtained by the color converting unit into a signal of n bits showing a brightness and a color tone, wherein m>n=k+1.

According to another aspect of the invention, there is provided a signal processing method which can output a chroma signal of m bits as a chroma signal of n bits by an out-put apparatus, comprising: a gamma converting step of gamma converting the chroma signal of m bits into a chroma signal of k bits; a color converting step of converting the chroma signal of k bits obtained in the gamma converting step into a signal of k bits showing a brightness and a color tone; and a bit converting step of converting the signal of k bits showing the brightness and color tone obtained in the color converting step into a signal of n bits showing a brightness and a color tone, wherein m>n=k+1.

The above and other objects and features of the present invention will become apparent from the following detailed description and the appended claims with reference to the accompanying drawings.

BRIEF DESCRIPTION OF THE DRAWINGS

Figure 3:
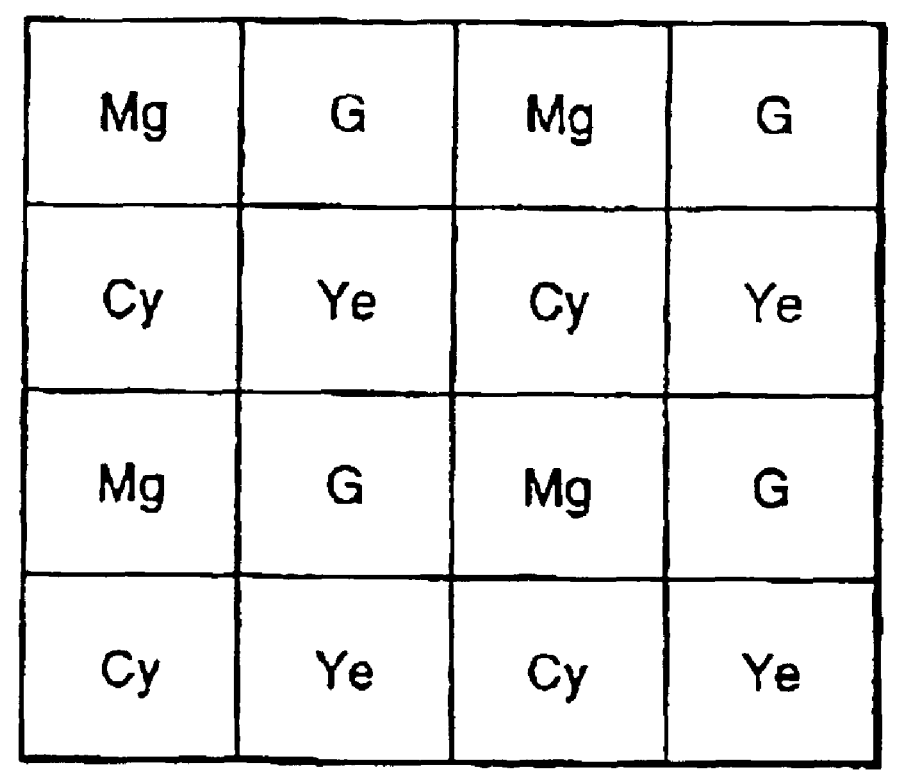

FIG. 3 is a schematic diagram showing an example of complementary filters;

DETAILED DESCRIPTION OF THE PREFERRED EMBODIMENTS

An embodiment of the invention will now be described in detail hereinbelow with reference to the drawings.

Figure 1:
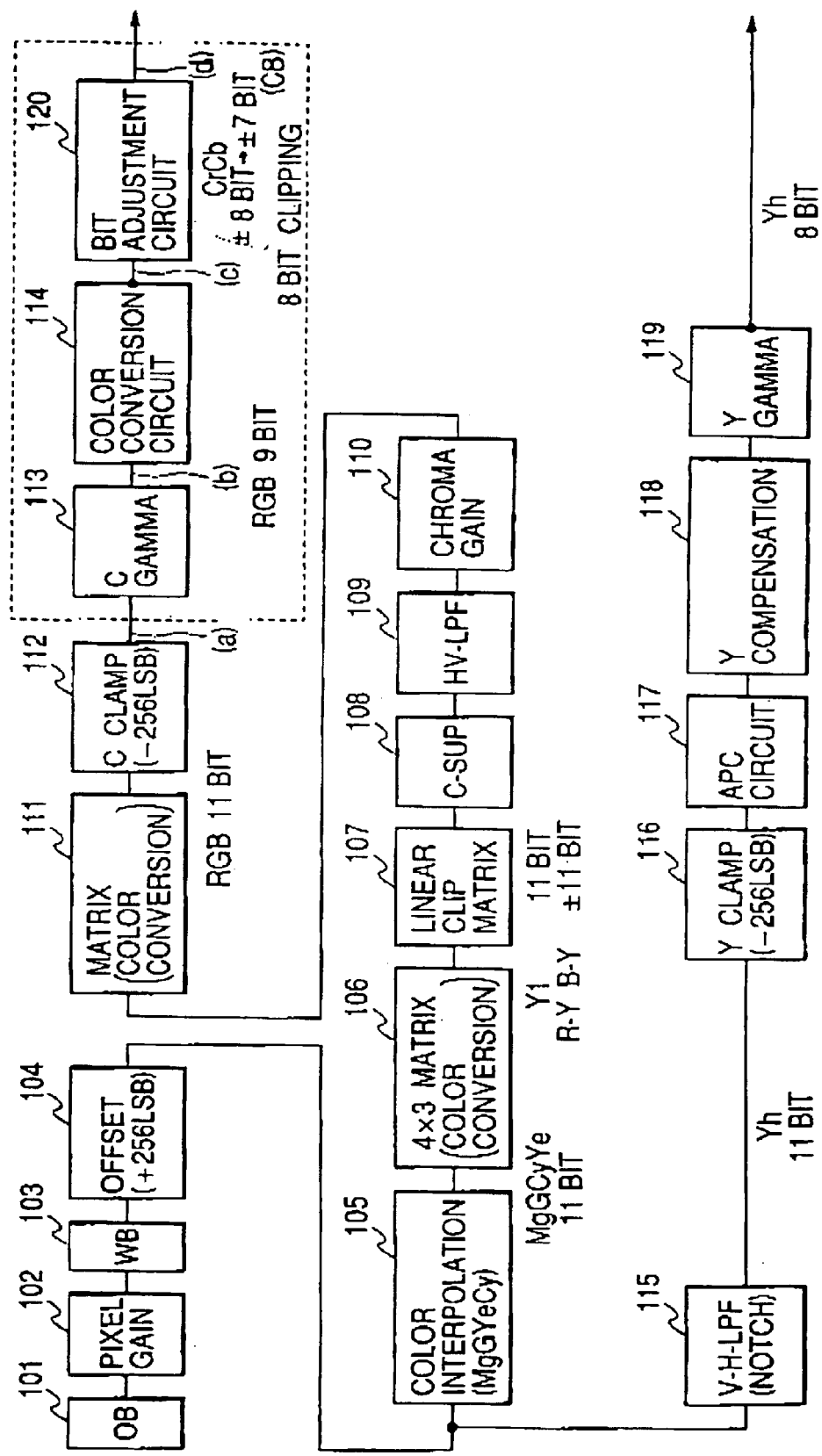
FIG. 1 is a block diagram showing a construction of a signal processing apparatus of an embodiment of the invention.
Figure 2:
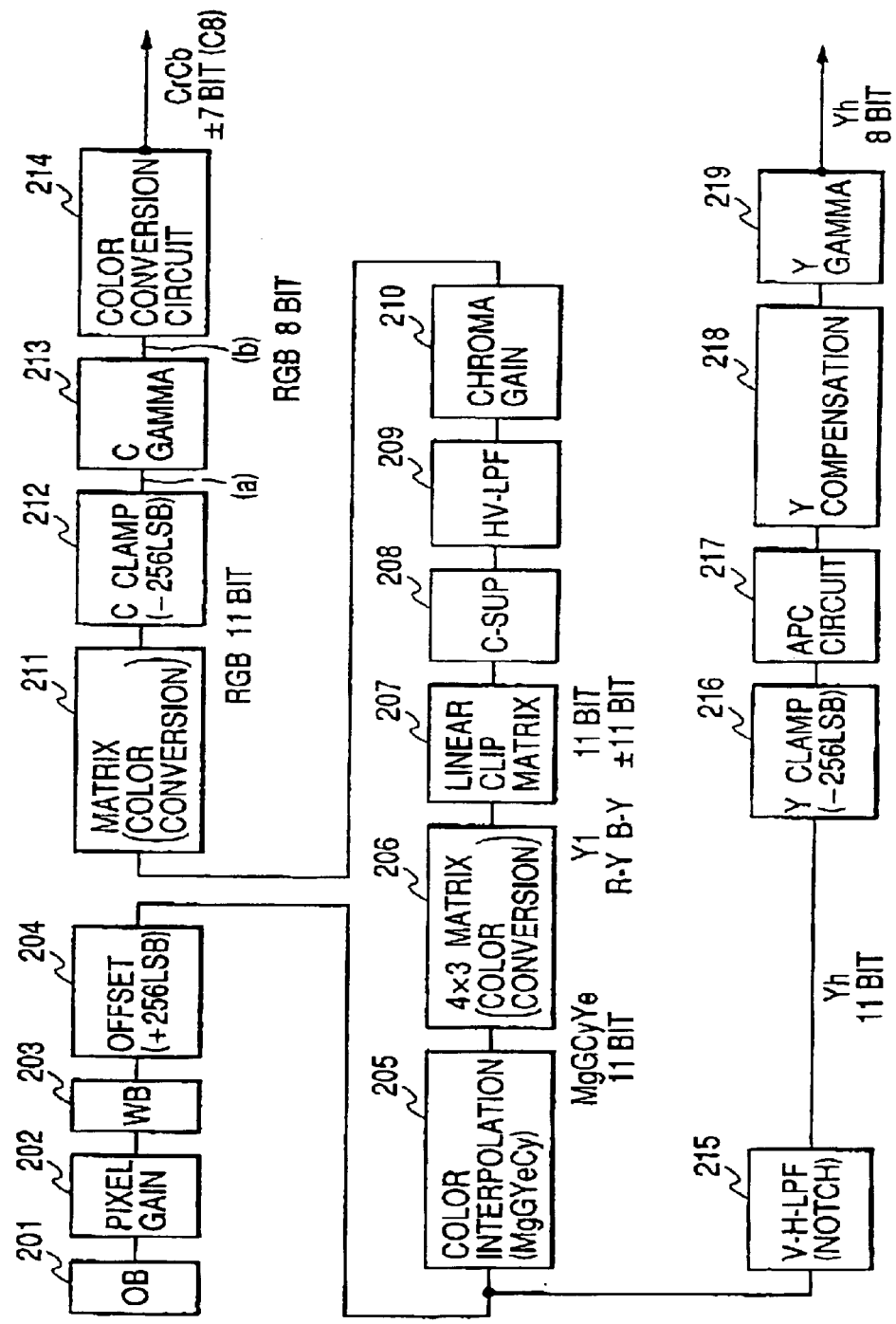
FIG. 2 is a block diagram showing an example of a construction of a conventional signal processing apparatus.
Figure 4:
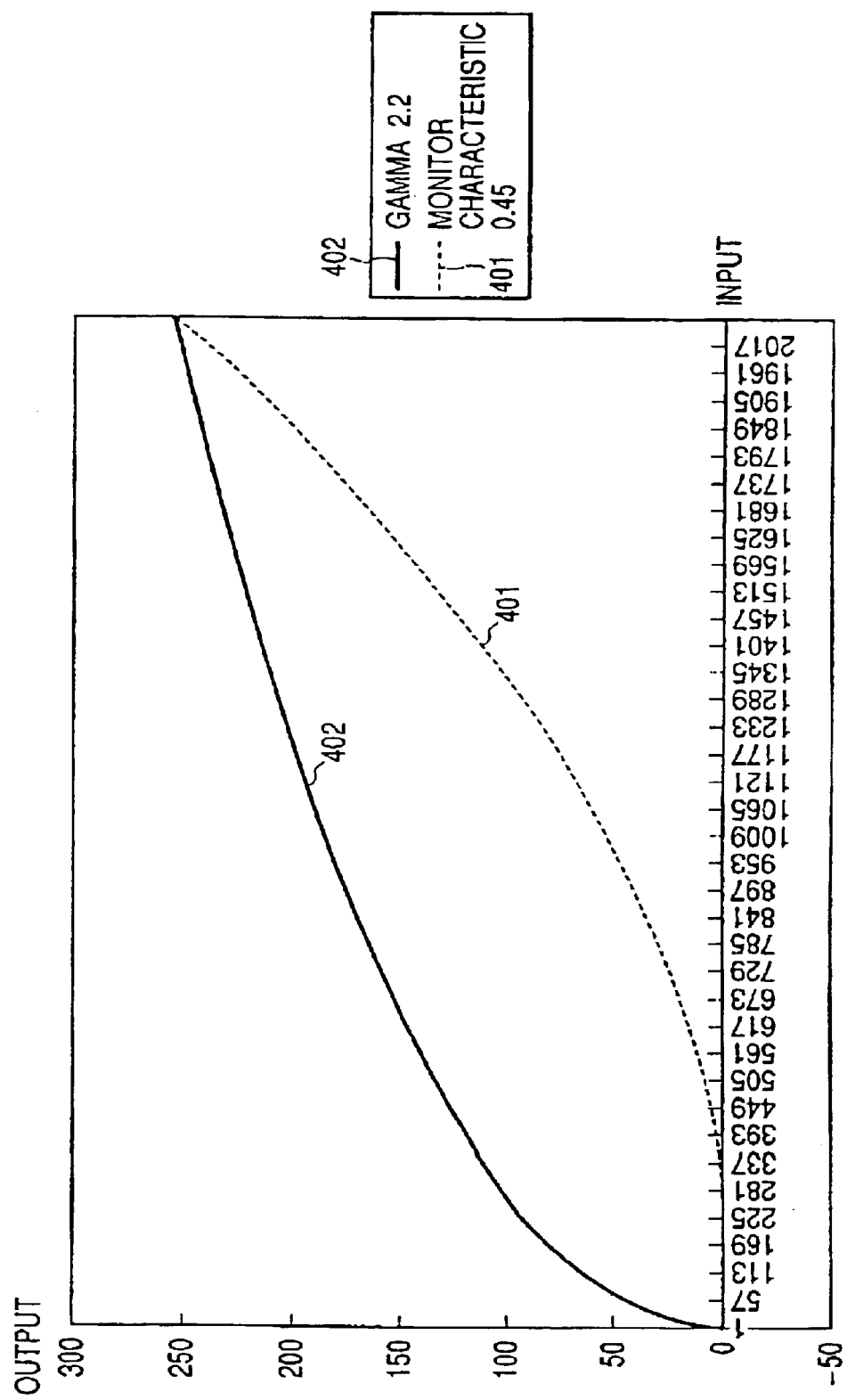
FIG. 4 is a graph showing gamma characteristics of a monitor as an output apparatus.

FIG. 1 shows a circuit construction of a signal processing apparatus according to an embodiment of the invention.

A black component is removed from a complementary signal (MgCyYe) from image pickup devices (not shown) by an OB (Optical Black) circuit 101 and a variation of the image pickup devices is corrected by a pixel gain circuit 102. After that, a white balance is corrected by a WB (White Balance) circuit 103 and a predetermined amount of offset is added by an offset circuit 104. An output signal of the offset circuit 104 is separately input to the luminance signal formation processing system and chroma signal formation processing system.

In the luminance signal formation processing system, a color filter level difference is removed by a notch filter (Y-LPF) circuit 115, a clamping process is performed to the luminance signal by a Y clamp circuit 116, and an edge is emphasized by an APC (aperture) circuit 117. An output signal of the APC circuit 117 is corrected by a Y compensation circuit 118 by the color difference signals. A gamma correction is performed by a Y gamma circuit 119 by using the C gamma curve 504 of 8 bits in FIG. 5, so that the signal becomes the Yh signal (luminance signal) of 8 bits.

In the chroma signal formation processing system, the dropped pixels of all of four colors are interpolated by a color interpolation circuit 105 and the signal is converted into the complementary colors (MgCyYe)→pure colors (RGB)→luminance color difference (Yl,R−Y,B−Y) signals by a color matrix circuit 106. After a subtle color correction was performed by a linear clip matrix circuit 107, a color suppression of a saturation area is performed by a C-SUP (chroma suppression) circuit 108. An output of the C-SUP circuit 108 is band limited by a low pass filter circuit 109.

The R−Y and B−Y color difference signals (±11 bits) which were band limited by the low pass filter circuit 109 are sent to a chroma gain circuit 110 and saturations are adjusted. The signals again become the RGB signals (11 bits) via a matrix circuit 111 using an output signal from the chroma gain circuit 110 and the low band luminance signal Yl. An output of the matrix circuit 111 is gamma converted by a C gamma circuit 113.

In the present embodiment, an output range of the C gamma circuit 113 is set to 9 bits, thereby increasing a gradient of a gamma curve in a luminance area at a predetermined level or higher. An output range of the Y gamma circuit 119 is set to 8 bits. Output signals (RGB, 9 bits) of the C gamma circuit 113 are converted into YCrCb (CrCb=±8 bits (c9)) signals by a color conversion circuit 114 and adjusted to the signals of the number of bits (CrCb=±7 bits (c8)) of the output apparatus such as a monitor or the like by a bit adjustment circuit 120. (The luminance signal Yl which is formed by the color conversion circuit 114 is not output to the output apparatus.)

The RGB signals set to 8 bits (c9) are formed using the Yh signal set to 8 bits from the luminance signal formation processing system and the CrCb signals set to ±7 bits (c8) from the chroma signal formation processing system and output to an output apparatus, such as a monitor or the like.

An effect of the improvement of the color gradation reconstruction, which is obtained by increasing the number of output bits of the C gamma circuit 113 as a main component element of the embodiment, will be described hereinbelow.

Figure 5:
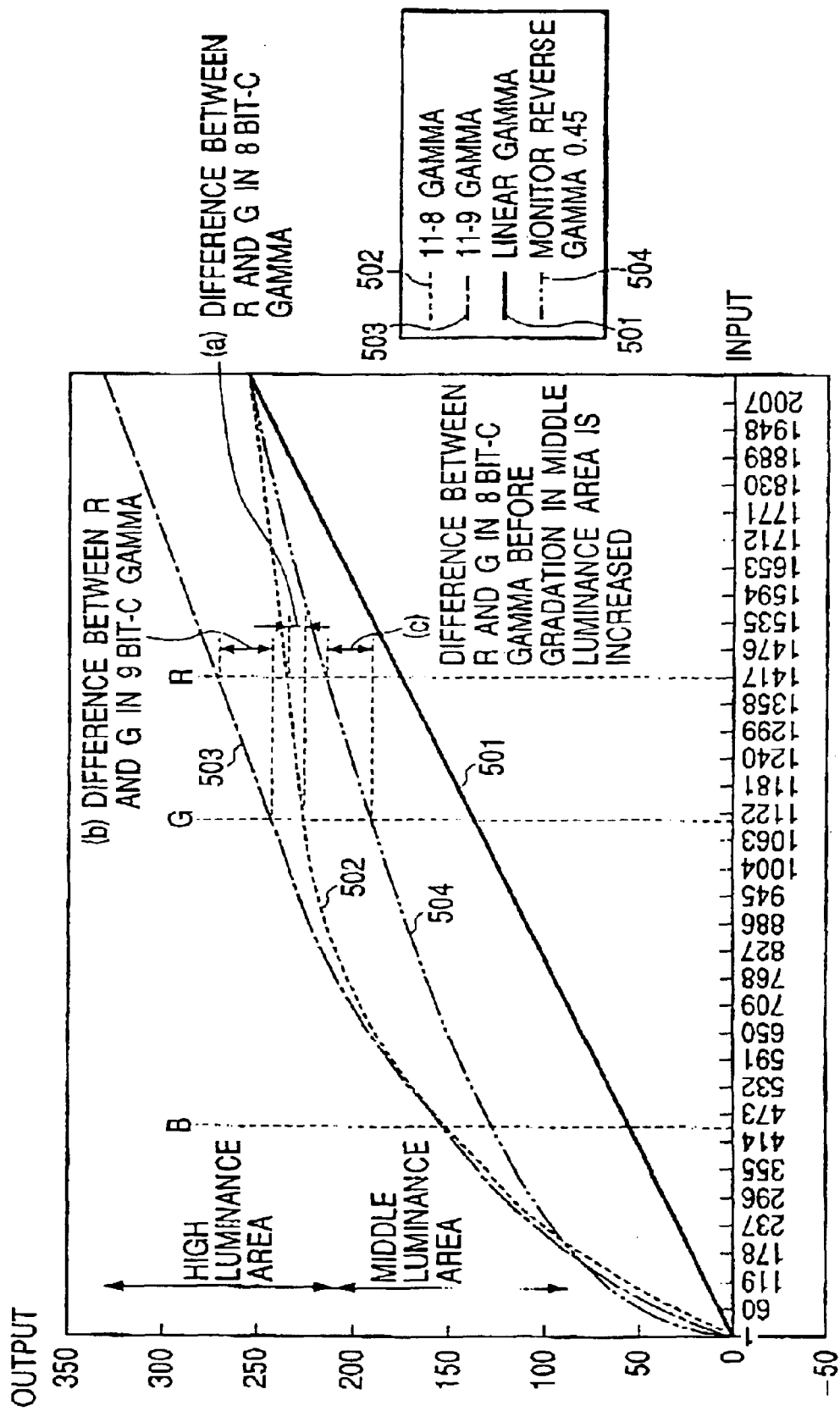
FIG. 5 is a graph showing a curve for performing each gamma converting process.

In the present embodiment, the number of bits of the gamma conversion of the chroma signal is set to be larger than that of the luminance gamma conversion, thereby preventing a deterioration of the color gradations. A curve 503 in FIG. 5 shows a gamma curve of 9 bits and a gradient of the curve in a range from the middle luminance area to the high luminance area can be increased relative to that of the 8-bit gamma curve 502 because the maximum output is larger than that of the 8-bit gamma. Therefore, a level difference among the RGB signals after the gamma conversion does not change to a level larger than that of 8 bits of C gamma. Thus, the saturation in the high luminance area is hardly deteriorated (refer to FIG. 5(b)).

The 9-bit RGB signals after the gamma conversion are subjected to an 8-bit limitation of a non-linear process by the bit adjustment circuit 120. In this case, although the CrCb signals are bit limited to the 9-bit (±8 bits (c9)) signals, since the color difference signals do not become extremely large even if the number of bits of the RGB signals is larger than 8, the color reconstruction is not deteriorated.

Figures 6, 7:
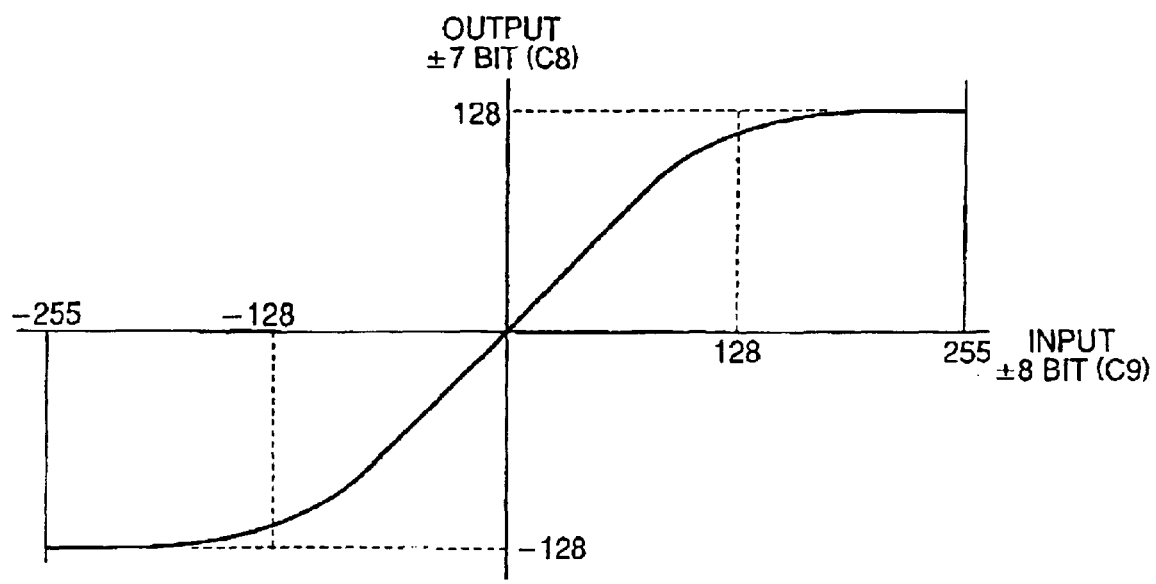
FIG. 6 is a graph showing a conversion curve of a bit adjustment circuit 120.
FIG. 7 is a diagram showing an example of a conversion from chroma signals (RGB) to chromaticity signals (U, V).

FIG. 6 is a diagram showing input (±8 bits (c9))–output (±7 bits (c8)) characteristics of the bit adjustment circuit 120. When either the Cr signal or the Cb signal enters a non-linear area at a predetermined input level or higher and is gain corrected, the other color difference signal is also multiplied by the same gain, thereby preventing the hue from changing. When both Cr and Cb signals enter the non-linear area and are gain corrected, those two gains are compared The smaller gain is selected and multiplied to Cr and Cb.

An example of the gamma conversion using the output characteristics of RGB 9 bits according to the embodiment will be discussed hereinbelow.

(a) Before gamma (11-bit RGB)
R=1400
G=1100
B=400

(b) After gamma (9-bit RGB)
R=239
G=242
B=140

(c) RGB-YCrCb conversion $$Yl = 0.3R + 0.59G + 0.11B$$
$$= 239$$
$$Cr = R - Y = 30$$
$$Cb = B - Y = -99$$

(d) Bit adjustment (±6 bits→±7 bits)
Cr=30
Cb=−99
(There is no change in the example because the input signal levels of the bit adjustment circuit lie within the linear areas.)

(e) MIX (synthesis) with Yh signal on the output apparatus side $$Yh = 220$$
$$R = Cr + Yh$$
$$= 251$$
$$B = Cb + Yh$$
$$= 121$$
$$G = (Yh - 0.3R - 0.11B)/0.59$$
$$= 223$$

As mentioned above, the outputs of RGB which are obtained are based on conversion by the 9-bit gamma curve 503 (R, G, B)=(251, 121, 223)

in response to conversion by the 8-bit gamma curve 502 (R, G, B)=(235, 139, 212)

Saturation in the case of a C gamma curve 503 of 9 bits is stronger than that of a C gamma curve 502 of 8 bits, the deviation of the hue is also smaller, and a white skip of the color occurs less.

According to the present embodiment, with the above construction, by setting the number of output bits of the gamma conversion of the chroma signal to a value larger than that of the luminance gamma conversion and by using a gamma curve which does not reduce the gradations of the high luminance area, a deterioration of the color gradation reconstruction of the reproduction image is prevented.

For example, when the number of input bits of the output apparatus, such as a monitor or the like, is equal to 8, in the signal processing apparatus of the present embodiment, the input of the Y gamma circuit is set to 11 bits, its output is set to 8 bits, the input of the C gamma circuit is set to 11 bits, and its output is set to 9 bits. By setting the output of the C gamma circuit to 9 bits, as mentioned above, when the 8-bit gamma is used, the gradient in the luminance area at the saturated predetermined level or higher can be set to be larger, and color crush can be fairly reduced.

To form the final RGB image signals by mixing with the output luminance signal Yh of the Y gamma circuit, the output signals (RGB, 9 bits) of the C gamma circuit are color converted into YCrCb signals. The CrCb signals obtained by color conversion are non-linearly operated to the bit width (±7 bits) of the output apparatus in accordance with the bit width of the output apparatus. In a non-linear arithmetic operation, even if the RGB signals have a range of 9 bits, the color difference signals do not increase extremely, so long as the saturation and the illuminance are not abnormally large. Even if the signals after color difference conversion are non-linearly converted and the number of bits is reduced, a resultant picture is not adversely influenced. Therefore, if the C gamma curve, as shown by the curve 503 in FIG. 5, is used, for example, the color reconstruction, white crush, and change in hue (discoloration) in the high luminance area are remarkably improved.

[Another Embodiment]

Although CrCb conversion has been performed in the color conversion circuit 114 in the above embodiment, YUV conversion also can be performed in accordance with a format of the output apparatus at the post stage. In this case, chroma signal conversion is executed in the color conversion circuit 114 using the following arithmetic operations.

$$Y = 0.2990 \times R + 0.5870 \times G + 0.1140 \times B$$

(The converted Y signal is not actually output to the output apparatus.)

$$V = 0.5000 \times R - 0.4187 \times G - 0.0813 \times B$$

$$U = -0.1684 \times R - 0.3316 \times G + 0.5000 \times B$$

The chromaticity signals U and V obtained by the color conversion circuit 114 as shown in a conversion example of FIG. 7.

Even in the case of performing CrCb conversion in the color conversion circuit 114, if the maximum output of the C gamma circuit 113 is set such that the output exceeds ±7 bits (in the present embodiment, it is sufficient to set the maximum output to 365 or less), such a construction that one upper bit is omitted and only eight lower bits are output can be obtained in the bit adjustment circuit 120. With respect to UV conversion, the same process can be applied. According to such construction, a burden of processes in the bit adjustment circuit 120 at the post stage is reduced.

What is claimed is:

1. A signal processing apparatus which can output a brightness signal and a color signal, comprising:

a first gamma converting circuit which performs first gamma conversion to the color signal;

a second gamma converting circuit which performs second gamma conversion to the brightness signal, a characteristic of the second gamma conversion being different from a characteristic of the first gamma conversion; and a bit adjustment circuit which adjusts the number of bits of the color signal gamma-converted by said first gamma converting circuit.

2. A signal processing apparatus according to claim 1, further comprising a color converting circuit which converts the color signal gamma-converted by said first gamma converting circuit into color difference signals, wherein said bit adjustment circuit adjusts the number of bits of the color difference signals.

3. A signal processing apparatus according to claim 2, wherein said bit adjustment circuit linearly converts a signal at a predetermined input level or lower in the color difference signal obtained by said color converting circuit and non-linearly converts a signal at the predetermined input level or higher into a color difference signal.

4. A signal processing apparatus according to claim 1, further comprising a color converting circuit which converts the color signal gamma-converted by said first gamma converting circuit into color difference signals (U, V), wherein said bit adjustment circuit adjusts the number of bits of the color difference signals (U, V).

5. A signal processing apparatus according to claim 4, wherein said bit adjustment circuit omits at least one upper bit in the color difference signals (U, V).

6. A signal processing method which can output a brightness signal and a color signal, comprising:

a first gamma converting step of performing first gamma conversion to the color signal;

a second gamma converting step of performing second gamma conversion to the brightness signal, a characteristic of the second gamma conversion being different from a characteristic of the first gamma conversion; and a bit adjustment step of adjusting the number of bits of the color signal gamma-converted in said first gamma converting step.

7. A signal processing method according to claim 6, further comprising a color converting step of converting the color signal gamma-converted in said first gamma converting step into color difference signals, wherein in said bit adjustment step, the number of bits of the color difference signals is adjusted.

8. A signal processing method according to claim 7, wherein in said bit adjustment step, a signal at a predetermined input level or lower in the color difference signal obtained in said color converting step is linearly converted into said color difference signals and a signal at a predetermined input level or higher is non-linearly converted into the color difference signals.

9. A signal processing method according to claim 6, further comprising a color converting step of converting the color signal gamma-converted in said first gamma converting step into color difference signals (U, V), wherein in said bit adjustment step, the number of bits of the color difference signals (U, V) is adjusted.

10. A signal processing method according to claim 9, wherein in said bit adjustment step, one upper bit in the color difference signals (U, V) is omitted.

11. A signal processing apparatus according to claim 1, wherein an inclination in the characteristic of the first gamma conversion is larger than an inclination in the characteristic of the second gamma conversion.

12. A signal processing apparatus according to claim 1, wherein the number of bits of said first gamma converting circuit which performs the first gamma conversion to the color signal is larger than the number of bits of said second gamma converting circuit which performs the second gamma conversion.

13. A signal processing apparatus according to claim 1, wherein said bit adjustment circuit reduces the number of bits of the color signal.

14. A signal processing apparatus according to claim 2, wherein said bit adjustment circuit omits one upper bit in the color difference signals.

15. A signal processing apparatus according to claim 2, wherein said color converting circuit converts the color signal into CrCb color difference signals (Cr, Cb).

16. A signal processing method according to claim 6, wherein an inclination in the characteristic of the first gamma conversion is larger than an inclination in the characteristic of the second gamma conversion.

17. A signal processing method according to claim 6, wherein the number of bits in said first gamma converting step in which the first gamma conversion is performed to the color signal is larger than the number of bits in said second gamma converting step in which the second gamma conversion is performed.

18. A signal processing method according to claim 6, wherein in said bit adjustment step, the number of bits of the color signal is reduced.

19. A signal processing apparatus according to claim 7, wherein in said bit adjustment step, at least one upper bit in the color difference signals is omitted.

20. A signal processing apparatus according to claim 7, wherein in said color converting step, the color signal is converted into CrCb color difference signals (Cr, Cb).

* * * * *

UNITED STATES PATENT AND TRADEMARK OFFICE
CERTIFICATE OF CORRECTION

PATENT NO.   : 6,917,382 B1
DATED        : July 12, 2005
INVENTOR(S)  : Eiichiro Ikeda It is certified that error appears in the above-identified patent and that said Letters Patent is hereby corrected as shown below:

Column 1,
Line 37, "ti" should be deleted.
Line 51, "ROB" should read -- RGB --.

Column 3,
Line 26, "chrome" should read -- chroma --.
Line 40, "out-put" should read -- output --.

Column 5,
Line 62, "(±6 bits" should read -- (±8 bits --.

Signed and Sealed this

Sixth Day of June, 2006

JON W. DUDAS
*Director of the United States Patent and Trademark Office*